(12) United States Patent
Shen

(10) Patent No.: US 6,606,959 B1
(45) Date of Patent: Aug. 19, 2003

(54) HIGH SPEED DRAG REDUCING VENTILATION FOR MARINE VESSEL HULLS

(75) Inventor: Young T. Shen, Potomac, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/166,634

(22) Filed: Jun. 12, 2002

(51) Int. Cl.⁷ .............................................. B63B 27/00
(52) U.S. Cl. ...................................................... 114/271
(58) Field of Search ............................ 114/271, 145 R, 114/144 R; 440/41

(56) References Cited

U.S. PATENT DOCUMENTS 1,256,786 A * 2/1918 Gatchell ................. 114/145 R
2,663,276 A * 12/1953 Ouellet .................... 114/145 R
3,831,543 A * 8/1974 Hamasaki ............... 114/145 R
5,813,357 A * 9/1998 Watson .................... 114/145 R
6,174,210 B1 * 1/2001 Spade et al. .................. 440/41
6,276,293 B1    8/2001 Shen et al.

* cited by examiner

*Primary Examiner*—S. Joseph Morano
*Assistant Examiner*—Lars A. Olson
(74) *Attorney, Agent, or Firm*—Jacob Shuster

(57) ABSTRACT

Spaced cambered wedges having flow diverting surfaces thereon are deployed from retracted positions within the smooth surfaced sides of a marine vessel hull undergoing water travel above a high speed, under which air ventilated cavities are established by the deployed wedges along the sides of the hull, imposing drag on the hull sides of a substantially reduced magnitude as compared to that otherwise imposed directly by the water alone.

11 Claims, 2 Drawing Sheets

HIGH SPEED DRAG REDUCING VENTILATION FOR MARINE VESSEL HULLS

The present invention relates generally to reducing drag resistance on marine vessels during travel.

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

During travel of a marine vessel within a body of water, flow of fluid relative to the solid external surfaces of the vessel hull is retarded by frictional contact imposing resistance to movement of the vessel dominated by frictional drag at high speeds. Many methods have been proposed to minimize such high speed drag resistance along the vessel hull, including emission of air bubbles, polymer injection, compliant coating and laminar boundary layer control by heating. While a degree of success may be achieved by such methods, various technical and practical problems are experienced therewith by reason of which high-speed friction drag reduction under efficient vessel propulsion operation remains a most challenging task. It is therefore an important object of the present invention to reduce drag resistance at high speeds without detracting from efficient operation of the marine vessel at all speeds of travel.

SUMMARY OF THE INVENTION

In accordance with the present invention, spaced water flow diverting wedges are mounted on the vertical sides of a marine vessel hull for deployment from retracted positions to protract flow diverting surfaces thereon of reduced length extending at a suitable angle from the smooth surfaced sides of the hull in the direction of travel so as to establish air ventilated cavities along the hull sides, within which the water is mixed with air, imposing drag resistance on the hull sides that is substantially less than that imposed directly by the water alone.

DESCRIPTION OF DRAWING FIGURES

DETAILED DESCRIPTION OF PREFERRED EMBODIMENTS

Figure 1:
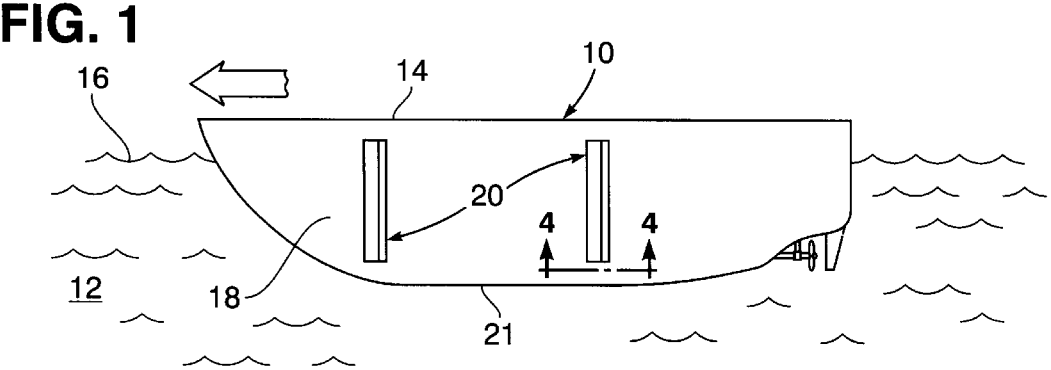
FIG. 1 is a simplified side elevation view of a typical marine vessel hull, with the flow diverting wedges thereon deployed during travel through a body of water.
Figure 2:
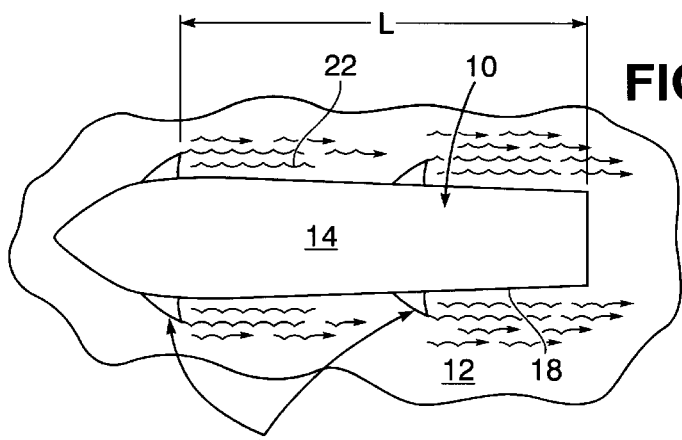
FIGS. 2 and 3 are respectively top and front end views of the hull shown in FIG. 1.
Figure 3:
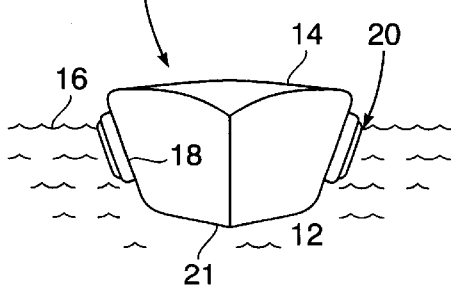

Referring now to the drawing in detail, FIGS. 1, 2 and 3 illustrate a marine vessel hull 10 undergoing travel while floatingly supported within a body of water 12, with its top 14 spaced above the water surface level 16. The opposite vertical sides 18 of the hull 10 have series of laterally aligned cambered flow diverting wedges 20 mounted therein and protruding therefrom when deployed as shown, so as to establish ventilated cavities 22 within the water along such hull sides 18 during travel, as hereinafter explained. Each of the cambered wedges 20 extends vertically from a location slightly above the water surface level 16 to a depth somewhat above the keel 21 of the hull. The number of such wedges 20 on each hull side 18, the spacing therebetween, their sizes and wedge angles ($\alpha$) and vertical lengths will vary, depending on the length of the vessel hull 10 and other factors as hereinafter explained.

Figure 4:
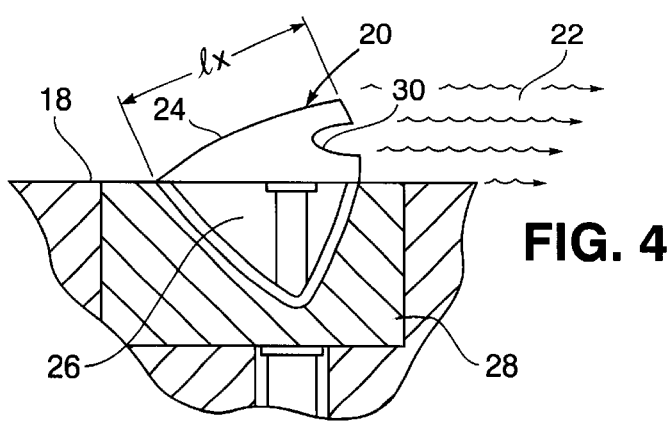
FIG. 4 is a partial section view taken substantial through a plane indicated by section line 4—4 in FIG. 1, showing in detail one embodiment of the flow diverting wedges in a deployed position.
Figure 4A:
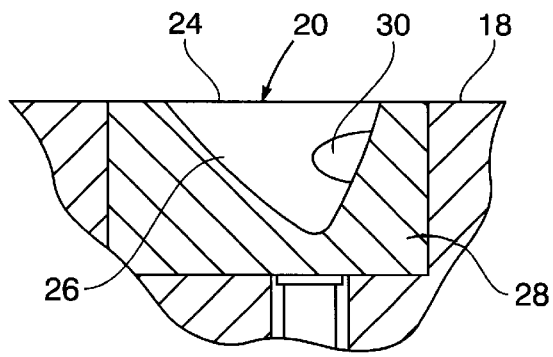
FIG. 4A is a partial section view corresponding to that of FIG. 4, showing the flow diverting wedge in a retracted position.

In accordance with one embodiment, each of the cambered wedges 20 as shown in greater detail in FIG. 4, is of a generally triangular cross-sectional shape having a water flow diverting surface 24 that is slightly curved depending on the general side curvature of the hull side 18 and extending at an angle from its smooth surface in the direction of travel, when the wedges 20 are deployed as shown. Under travel at high speeds, above 45 to 50 knots, such wedges 20 generate the ventilated cavities 22 along the hull sides 18 as diagrammed in FIG. 2, filled with a mixture of atmospheric air and water. The drag imposed on the hull 10 by such air ventilated cavities 22 on the hull sides 18 at the high travel speed, is less than the friction drag ordinarily imposed by the water alone on the hull side surfaces. Thus, at the lower travel speeds of 45 knots or less, the wedges 20 are pivotally retracted as shown in FIG. 4A, into reception openings 26 formed within mounting blocks 28 positioned in the hull sides 18. In order to provide for inflow of additional atmospheric air into the air/water mixture within the ventilated cavities 22, if needed below certain depths, a recess 30 is formed in the trailing end of the wedges 20 for exposure to the air ventilated cavities 22, when the wedges 30 are deployed as shown in FIG. 4. The magnitude of drag (D) imposed by such ventilated cavity 22 under travel speed (V) depends on the associated cavitation number ($\sigma$) and the cavity drag coefficient ($C_D$), so that: $C_D(\sigma)=C_D(0)[1+\sigma]$ when $\sigma$ is small. For a fully vented cavity 22, when a $\sigma=0$, the ventilated cavity drag coefficient $C_D(0)=2(t/C)/\pi$, where (t) is the wedge thickness and (C) is the wedge chord length. The ventilated cavity drag (D), is then given as: $D=C_D(0) [0.5 \rho V^{2}]$ (t/2), while the cavity length (L) is given by:

$$L = \frac{8t}{\pi\sigma^2} C_D(0).$$

Based on the foregoing formulae, the dimensions, the number and spacings between the triangular type wedges 20 as shown in FIG. 4, may be optimized for a given hull 10. Also, the value of the high speed of travel velocity (V) above which wedge deployment is to be effected may be determined. The flow diverting surface 24 having a length (lx) then imposes a friction drag (F) having a coefficient ($C_f$) associated therewith, given as:

$F=C_f(Re) [0.5 \rho V^2]$ lx, where (Re) is the Reynolds number. Based on the foregoing, the ratio of ventilated cavity drag (D) to wedge friction drag (F) is estimated as:

$$D/F = \frac{\pi\sigma^2}{16C_f},$$

by setting L=lx, indicating that the friction drag (F) introduced by the wedge surface 24 is minimized relative to the drag (D) imposed by the ventilated cavities 22 as hereinafter pointed out.

Figure 5:
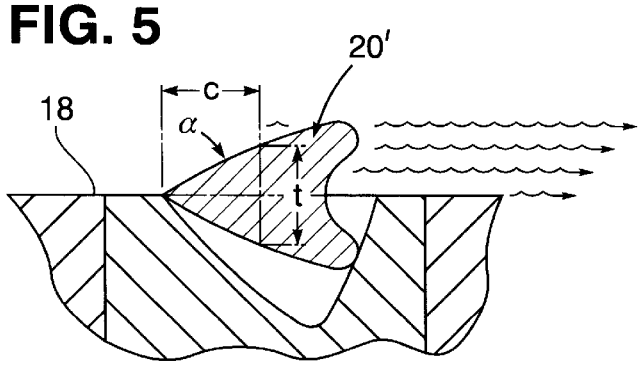
FIG. 5 is a partial section view corresponding to that of FIG. 4 illustrating a modified form of the flow diverting wedge, pursuant to another embodiment.

In accordance with another embodiment as shown in FIG. 5, a modified form of wedge 20', has a parabolic cross-sectional shape. Such wedge configuration provides a 38% reduction in the ratio of cavity drag (D) to wedge friction drag F, as reflected by:

$$D/F = 0.62 \frac{\pi \sigma^2}{16 C_f}.$$

Figure 6:
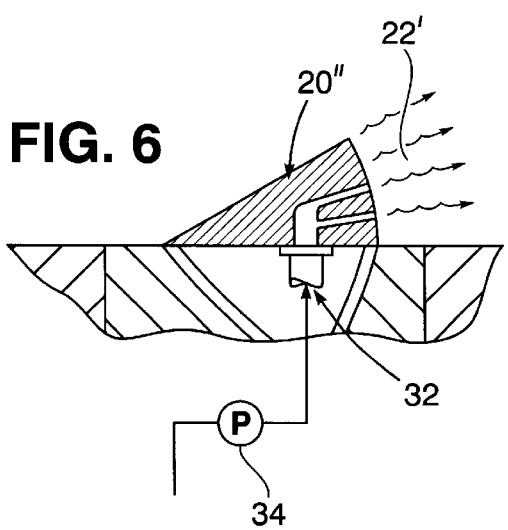
FIG. 6 is a partial section view illustrating yet another embodiment of the flow diverting wedge.

Pursuant to yet another embodiment of the present invention, as illustrated in FIG. 6, a piping system 32 is installed so that pressurized air from a diagrammed pump 34, of 15 psi for example, is introduced and conducted through a triangular shaped wedge 20" from the bottom portion of its trailing end into a ventilated cavity 22', within which pressurized air along with atmospheric air is mixed with the water for drag resistance reduction as hereinbefore described.

Thus, in accordance with the present invention a marine vessel or ship is operated under conventional conditions of a smooth surface hull, with the cambered wedges 20, 20' or 20" retracted at speeds less than 45 to 50 knots. At higher speeds greater than 45 to 50 knots, the series of wedges 20, 20' or 20" are deployed from the hull sides 18 so as to produce the air ventilated cavities 22 or 22', and thereby eliminate the hull surface friction drag resistance heretofore experienced at such high speeds of travel with reduced ventilated cavity drag imposed by the protracted flow diverting wedge surfaces 24.

Obviously, other modifications and variations of the present invention may be possible in light of the foregoing teachings. It is therefore to be understood that within the scope of the appended claims the invention may be practiced otherwise than as specifically described.

What is claimed is:

1. In combination with a marine vessel having a hull exposed to water below a water surface level during travel, a system for reducing drag resistance imposed on the hull at high speeds of said travel comprising: a plurality of wedges having flow diverting surfaces; and means mounting said wedges on the hull spaced from each other in direction of said travel for displacement between retracted and deployed positions wherein the flow diverting surfaces thereon are respectively flush with the hull and extend therefrom at an angle in direction of said travel; each of the flow diverting surfaces including: a trailing end portion extending from a retention recess in the hull from which the wedge is displaced to the deployed position without exposure of the retention recess to the water.

2. In combination with a marine vessel having a hull propelled in a direction of travel through a body of water imposing drag on opposite vertical sides of the hull below a surface level of said body of water during said travel at speeds below and above a predetermined value; means for reducing the drag imposed on said sides of the hull at the speeds above said predetermined value, including: flow diverting means displaced from retracted positions within the hull for cavitationally establishing ventilated cavities within the body of water along said sides of the hull, thereby avoiding water flow to impose drag substantially less than that otherwise directly imposed by the water alone during said travel above the predetermined speed value, said flow diverting means comprising: a series of cambered wedges spaced from each other in said direction of travel and respectively extending vertically above the surface level of the body of water; each of said wedges having a water flow diverting surface extending toward a trailing end of the wedge in said direction of travel at an angle to one of the sides of the hull, said trailing end being thereby exposed to one of the ventilated cavities when the wedge is deployed from the retracted position within the hull.

3. The combination as defined in claim 2, wherein said flow diverting surface is a slightly curved side of a generally triangular shaped cross-section of the wedge.

4. The combination as defined in claim 3, wherein the trailing end of the wedges have recesses formed therein, exposed to the ventilated cavities.

5. The combination as defined in claim 3, further including means for conducting pressurized air through the wedges and exiting from the trailing ends thereof into the ventilated cavities.

6. The combination as defined in claim 2, wherein each of said wedges is of a generally triangular shaped cross-section.

7. The combination as defined in claim 2, further including: means for conducting pressurized air through the flow diverting means into the ventilated cavities.

8. The combination as defined in claim 2, wherein said predetermined value during travel is between 45 and 50 knots.

9. In combination with a marine vessel having a hull subject to drag resistance by water in contact therewith which substantially increases during travel of the vessel above a predetermined high speed, a system for reducing said drag resistance imposed on the hull, comprising: flow diverting means mounted in the hull for displacement therefrom to cavitationally induce air ventilation precluding water flow in contact with the hull; and deployment means for effecting said displacement of the flow diverting means only during said travel above the predetermined high speed, said flow diverting means including: a plurality of movable surfaces spaced from each other along the hull and extending vertically above a surface level of the water.

10. The system as defined in claim 9, wherein each of said movable surfaces terminates at a trailing end surface extending laterally outward from the hull from which the water flow contact with the hull is avoided by said cavitationally induced air ventilation.

11. The system as defined in claim 10, wherein each of said movable surfaces with one of the trailing end surfaces extending therefrom is formed on a flow diverter wedge pivotally displaced between a retracted position within a retention recess in the hull and a deployed position projecting therefrom; said movable surface of the flow diverter wedge being flush with the hull in the retracted position, while the trailing end surface extends laterally from the retention recess in the hull without exposure thereof to the water in the deployed position of the wedge.

* * * * *